(12) United States Patent
Shim et al.

(10) Patent No.: US 10,759,412 B2
(45) Date of Patent: Sep. 1, 2020

(54) METHOD FOR IDENTIFYING DRIVING PATTERN OF HYBRID VEHICLE

(71) Applicants: Hyundai Motor Company, Seoul (KR); Kia Motors Corporation, Seoul (KR)

(72) Inventors: Jae-Yun Shim, Gyeonggi-do (KR); Il-Kwon Park, Seoul (KR); In-Eok Cho, Incheon (KR); Hoon Han, Gyeonggi-do (KR); Jae-Mun Lee, Seoul (KR); Dong-Su Ha, Hwaseong-si (KR); Dong-Jun Shin, Gyeonggi-do (KR); Kyung-Taek Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 16/149,659

(22) Filed: Oct. 2, 2018

(65) Prior Publication Data
US 2019/0202435 A1 Jul. 4, 2019

(30) Foreign Application Priority Data
Dec. 29, 2017 (KR) .................. 10-2017-0183531

(51) Int. Cl.
*B60W 10/08* (2006.01)
*B60W 20/15* (2016.01)
*B60W 30/182* (2020.01)
*B60W 40/09* (2012.01)
*B60W 20/13* (2016.01)

(52) U.S. Cl.
CPC ............ *B60W 20/15* (2016.01); *B60W 20/13* (2016.01); *B60W 30/182* (2013.01); *B60W 40/09* (2013.01); *B60W 2510/0676* (2013.01); *B60W 2510/086* (2013.01); *B60W 2520/105* (2013.01); *B60W 2555/20* (2020.02)

(58) Field of Classification Search
CPC .......... B60W 10/08; B60W 2510/244; B60W 2540/30; B60W 40/09
See application file for complete search history.

(56) References Cited

U.S. PATENT DOCUMENTS

| | | | |
|---|---|---|---|
| 2012/0122000 A1* | 5/2012 | Lee ............ | B60H 1/2218 429/429 |
| 2016/0159342 A1* | 6/2016 | Shin ............ | B60W 20/13 701/22 |
| 2018/0126980 A1* | 5/2018 | Kim ............ | B60W 20/40 |

FOREIGN PATENT DOCUMENTS

KR   1020160148372   * 6/2017

* cited by examiner

Primary Examiner — Kenneth J Malkowski
(74) Attorney, Agent, or Firm — Mintz Levin Cohn Ferris Glovsky and Popeo, P.C.; Peter F. Corless

(57) ABSTRACT

A method for identifying a driving pattern for fuel economy improvement of a hybrid vehicle is provided. The method includes allocating priorities in accordance with influences exerted on fuel economy based on a heating load and an electric load. A current driving pattern is then selected in the order of a high heating load driving pattern, a high electric load driving pattern, an aggressive driving pattern, a high speed driving pattern, and a city driving pattern.

16 Claims, 3 Drawing Sheets

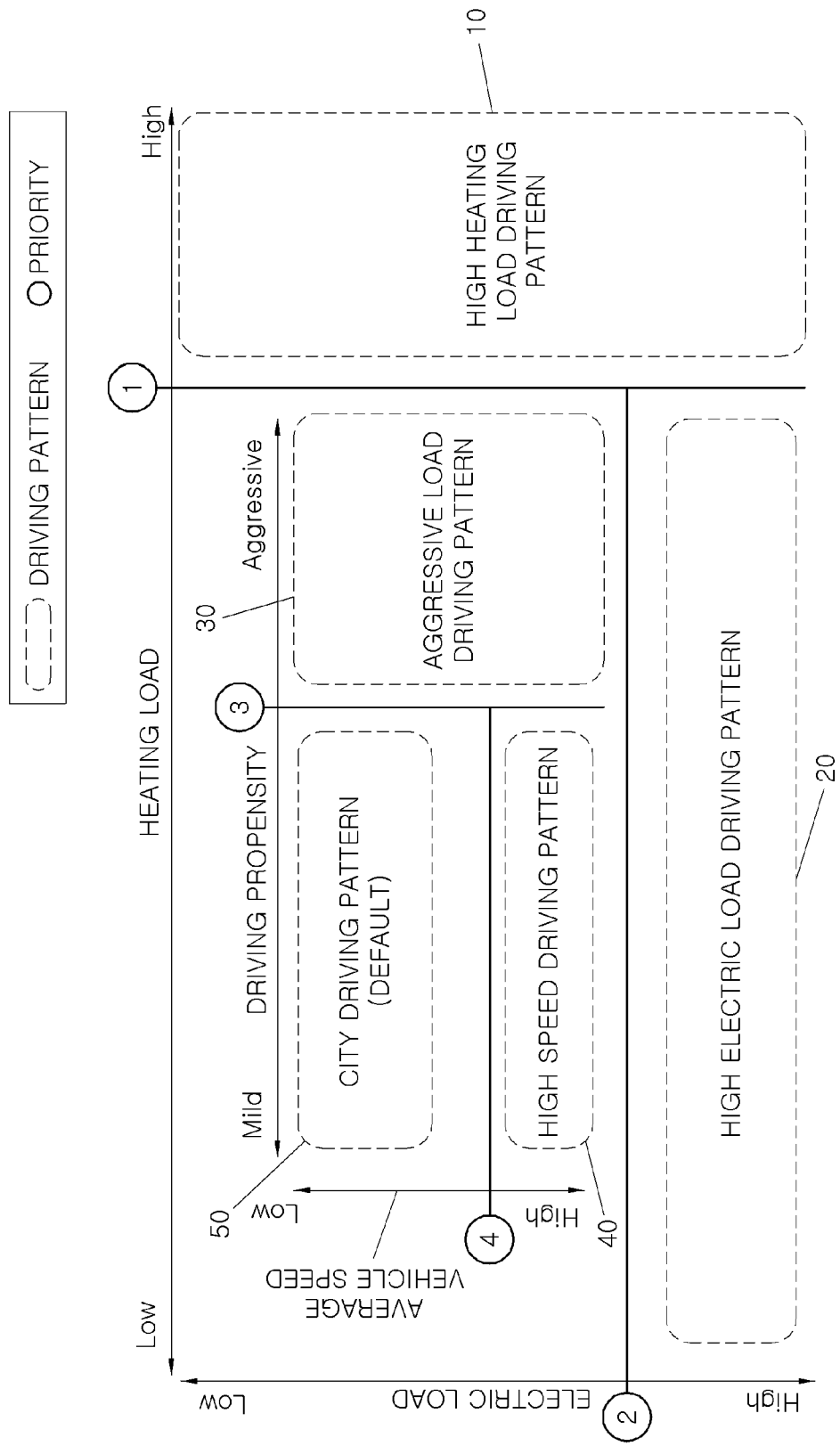

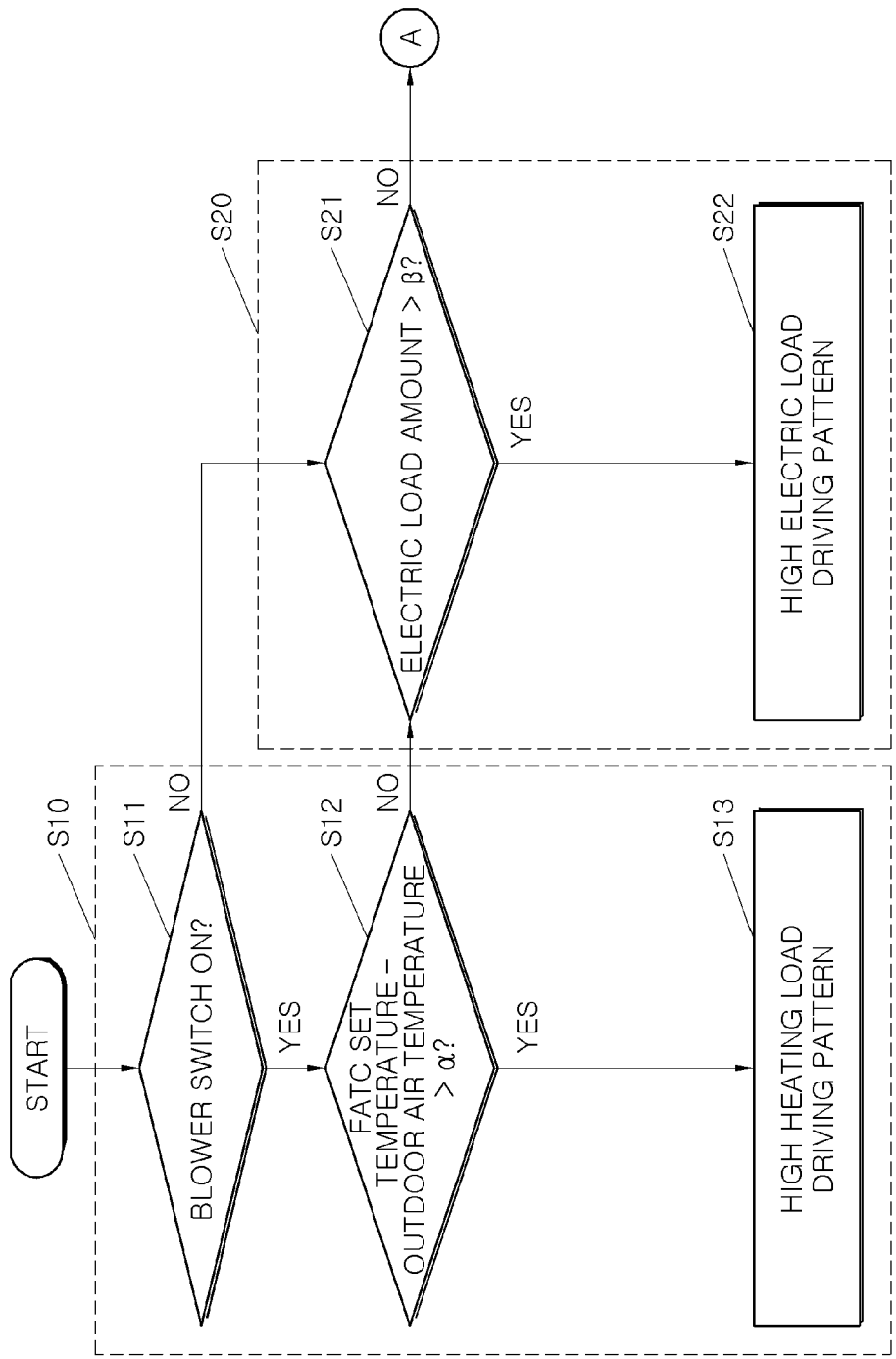

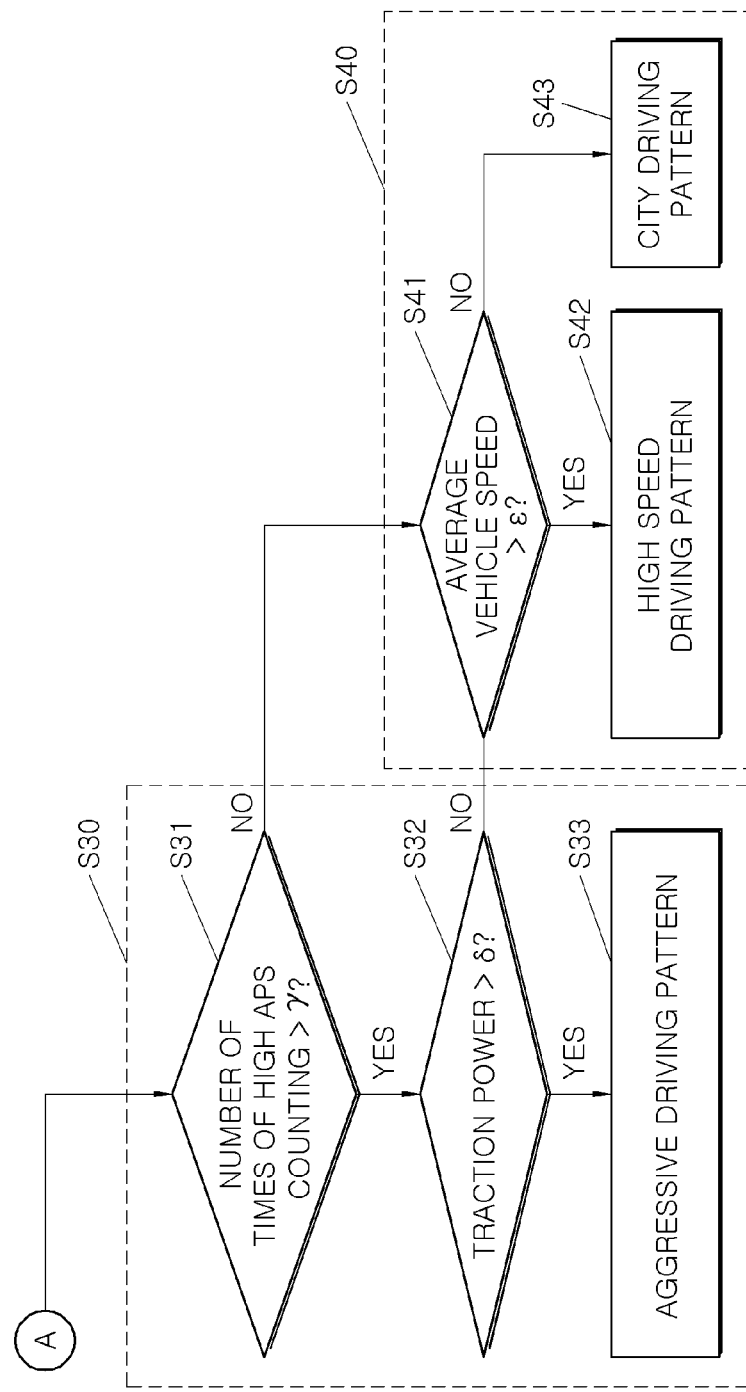

METHOD FOR IDENTIFYING DRIVING PATTERN OF HYBRID VEHICLE

CROSS-REFERENCE TO RELATED APPLICATIONS

This application claims priority to Korean Patent Application No. 10-2017-0183531, filed on Dec. 29, 2017, which is incorporated herein by reference in its entirety.

BACKGROUND

Field of the Disclosure

The present disclosure relates to a method for identifying a driving pattern of a hybrid vehicle, and particularly, to a method for identifying a driving pattern of a hybrid vehicle capable of optimizing fuel economy through classification of different driving patterns of the hybrid vehicle.

Description of the Related Art

Hybrid technology of a vehicle is a technology that improves a fuel economy through an optimization control of a plurality of power sources used in the vehicle. However, as compared with a general gasoline/diesel vehicle, since the hybrid vehicle many control factors, it may be affected by external environment changes, and thus, the fuel economy may also deteriorate. For example, in a low-temperature situation, heating is required at an engine start, and thus an electric vehicle (EV) driving function is limited to lower the fuel economy.

Accordingly, research for recognizing the driving situation of the vehicle and using the recognized driving situation for control has been conducted, and accurate driving pattern discrimination is an important factor in a fuel economy optimization technique, and is a technical field that can be continuously developed.

In the related art, loads are classified into highway, main road, suburbia, and city based on driving information of a vehicle, and the driving characteristic of a general vehicle is determined using a vehicle speed, accelerator pedal state (APS), vehicle acceleration, or road inclination, or the driving characteristic of a featured vehicle is found to be used for the control even in the same driving pattern, such as distinction between the city start pattern and the highway start pattern.

However, according to the related art, only the vehicle state or driving information is considered, and thus it may be difficult for the driving patterns classified accordingly to correspond to all driving situations. For example, in case of an aggressive driving pattern, the current APS state may cause misjudgment although the present state is not the aggressive driving situation, such as temporary high APS situation during an initial start or high APS state during high-speed constant driving. Particularly, in the related art, there is no pattern for recognizing the environment condition, such as a high heating load or high electric load pattern.

SUMMARY

Accordingly, the present disclosure provides a method for identifying a driving pattern of a hybrid vehicle, which may improve fuel economy by distinguishing between driving patterns of the hybrid vehicle to thus recognize various environmental conditions that may occur in real-road driving situations and performing hybrid control optimized to the driving patterns.

Other objects and advantages of the present disclosure can be understood by the following description, and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, a method for identifying a driving pattern for fuel economy improvement of a hybrid vehicle may include allocating priorities in accordance with influences exerted on fuel economy based on a heating load and an electric load, and selecting a current driving pattern in the order of a high heating load driving pattern, a high electric load driving pattern, an aggressive driving pattern, a high speed driving pattern, and a city driving pattern through a hybrid control unit (HCU).

A first priority may include whether the heating load is in a high heating load state, and when the heating load is in the high heating load state, the high heating load driving pattern may be selected as the current driving pattern. A second priority may include whether the electric load is in a high electric load state, and when the electric load is in the high electric load state, the high electric load driving pattern may be selected as the current driving pattern.

Additionally, a third priority may include whether driver propensity is aggressive, and when the driver propensity is aggressive, the aggressive driving pattern may be selected as the current driving pattern. A fourth priority may include whether an average vehicle speed is a high speed, and when the average vehicle speed is the high speed, the high speed driving pattern may be selected as the current driving pattern. When the average vehicle speed is not the high speed, the city driving pattern may be selected as the current driving pattern.

In accordance with another exemplary embodiment of the present disclosure, a method for identifying a driving pattern for fuel economy improvement of a hybrid vehicle may include selecting a current driving pattern by sequentially identifying a high heating load driving pattern, a high electric load driving pattern, an aggressive driving pattern, and a high speed driving pattern and a city driving pattern using an HCU in accordance with priorities determined by influences exerted on fuel economy based on a heating load and an electric load.

In particular, the identifying of the high heating load driving pattern includes identifying a high heating load driving situation by sequentially identifying a driver heating intention and a heating level. Additionally, the method may include determining whether a blower switch is in an on state by monitoring a blower switch condition of a full automatic temperature control (FATC).

Additionally, the identifying of the heating level may include determining whether a difference between an outdoor air temperature and a set temperature of the FATC is equal to or greater than a predetermined value. When the difference between the outdoor air temperature and the set temperature of the FATC is equal to or greater than the predetermined value, the of selecting the high heating load driving pattern may include selecting the high heating load driving pattern as the current driving pattern.

The identifying of the high electric load driving pattern may include identifying a high electric load driving situation by determining whether an electric load amount is equal to or greater than a predetermined value through identifying the electric load amount. When the electric load amount is equal to or greater than the predetermined value, the selecting of the high electric load driving pattern may include selecting the high electric load driving pattern as the current driving pattern.

Further, the identifying of the aggressive driving pattern may include identifying an aggressive driving situation by sequentially determining a repeated acceleration intention and a high driving load. The identifying of the repeated acceleration intention may including counting a situation in which an APS is equal to or greater than a predetermined value and determining a high APS state when the number of times of counting is equal to or greater than a predetermined value.

The identifying of the high driving load may include determining whether a traction power is equal to or greater than a predetermined value by calculating the traction power for recognizing the driving load. When the traction power is equal to or greater than the predetermined value, the selecting of the aggressive driving pattern may include selecting the aggressive driving pattern as the current driving pattern.

The identifying of the high speed driving pattern and the city driving pattern may include identifying a high speed driving situation by determining whether an average vehicle speed is equal to or greater than a predetermined value by calculating the average vehicle speed. When the average vehicle speed is equal to or greater than the predetermined value, the selecting of the high speed driving pattern may include selecting the high speed driving pattern as the current driving pattern. When the average vehicle speed is less than the predetermined value, the selecting of the city driving pattern may include selecting the city driving pattern as the current driving pattern.

According to the method for identifying the driving pattern of the hybrid vehicle according to the present disclosure, the vehicle driving situations are more accurately divided into the heating load condition including the environmental load state, the electric load state, the aggressive driving, and the city and high-speed driving states, which are not provided in the related art, and in the aggressive driving, both the APS state and the driving load may be identified to improve the misjudgment cases in the related art. Accordingly, the hybrid control may be optimized through selection of the driving pattern that is optimized to the fuel economy in accordance with the driving situation, and merchantability of the hybrid vehicle may be improved.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating the priority for identifying a driving pattern in a method for identifying a driving pattern of a hybrid vehicle according to an exemplary embodiment of the present disclosure; and FIGS. 2A-2B are flowcharts illustrating a method for identifying a driving pattern in a method for identifying a driving pattern of a hybrid vehicle according to an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for identifying a driving pattern of a hybrid vehicle according to the present disclosure will be described in detail with reference to the accompanying drawings. However, related well-known functions and configurations are not described in detail since they would obscure the subject matter of the disclosure in unnecessary detail.

FIG. 1 is a diagram illustrating the priority for identifying a driving pattern in a method for identifying a driving pattern of a hybrid vehicle according to exemplary embodiment of the present disclosure. Referring to FIG. 1, a method for identifying a driving pattern of a hybrid vehicle may include determining or distinguishing the driving pattern as follows. That is, the driving patterns may be determined based on different priorities. In particular, a first priority may be when a heating load is in a high heating load state and thus, a high heating load driving pattern 10 is identified, and then a second priority may be when an electric load is in a high electric load state and thus, a high electric load driving pattern 20 is identified. A third priority may be when the driver's propensity is aggressive and thus, an aggressive driving pattern 30 is identified, and a last fourth priority may be when an average vehicle speed is a high speed and thus, a high speed driving pattern 40 is identified. In other cases, a city driving pattern 50 may be identified.

In other words, according to the method for identifying the driving pattern of the hybrid vehicle, priorities are allocated in accordance with influences exerted on fuel economy based on a heating load and an electric load, and five types of driving patterns of the high heating load driving pattern 10, the high electric load driving pattern 20, the aggressive driving pattern 30, the high speed driving pattern 4, and the city driving pattern 50 may be sequentially identified.

FIGS. 2A-2B are flowcharts illustrating by steps a method for identifying a driving pattern in a method for identifying a driving pattern of a hybrid vehicle according to the present disclosure. The methods described herein below may be executed by a controller having a processor and a memory. Referring to FIGS. 2A-2B, a method for identifying a driving pattern of a hybrid vehicle according to an exemplary embodiment of the present disclosure may include identifying a high heating load driving pattern (S10), identifying a high electric load driving pattern (S20), identifying an aggressive driving pattern (S30), and identifying a high speed driving pattern and a city driving pattern (S40), which are successively performed.

The identifying of the high heating load driving pattern (S10) may include identifying a high heating load driving situation by detecting a driver's heating intention (S11) and a heating level (S12). The detecting of the driver's heating intention (S11) may include determining whether a blower switch is in an on state by monitoring a blower switch condition of a full automatic temperature controller (FATC). When the heating control is used in a situation in which the driver has no heating intention, fuel economy and battery state of charge (SOC) is negatively impacted or influenced, and thus, according to the present disclosure, the identifying of the driver's heating intention (S11) may be performed first.

When the identifying of the driver's heating intention (S11) identifies that the blower switch is in an on state, the identifying of the heating level (S12) may include determining whether a difference between an outdoor air temperature (measured by a sensor) and a set temperature of the FATC is equal to or greater than a predetermined value α. When the difference between the outdoor air temperature and the set temperature of the FATC is equal to or greater than the predetermined value α, the selecting of the high heating load driving pattern (S13) may include selecting the high heating load driving pattern 10 as the current driving pattern.

In the hybrid vehicle, when the heating load is substantial, an engine is driven by the FATC to secure heating calories in an electric vehicle (EV) mode, and this exerts a substantial influence on the fuel economy and the battery SOC. According to the present disclosure, the hybrid control may be optimized by identifying the high heating load driving situation as the first priority. In the identifying of the heating level (S12), a reduction speed of an engine cooling water temperature may be predicted by a deviation between the outdoor air temperature and the FATC set temperature, and such a deviation may be used to identify the heating load.

Additionally, it may also be possible to simply identify the heating load in consideration of the outdoor air temperature and the FATC set temperature as separate conditions, and although the accuracies thereof may differ from each other.

It may also be possible to identify the heating load in consideration of other temperature conditions, such as room temperature, engine cooling water temperature, and engine oil temperature instead of the outdoor air temperature and the FATC set temperature. Further, it may also be possible to identify the heating load through a blower step of the FATC in addition to the temperature conditions.

Further, the identifying of the high electric load driving pattern (S20) may include determining whether a calculated electric load amount is equal to or greater than a predetermined value β by detecting the electric load amount (S21), and when the electric load amount is equal to or greater than the predetermined value β, the high electric load driving pattern 20 may selected as the current driving pattern through selecting the high electric field driving pattern (S22).

In other words, the identifying of the high electric load driving pattern (S20) may include identifying a large electric load situation including a hot weather condition on which a load of an air conditioner (A/C) is substantial by monitoring the electric load amount. A modified exemplary embodiment may include identifying the electric load by recognition of the hot weather condition through an A/C operation state, A/C compressor power consumption, outdoor air temperature, and room temperature.

When the electric load is large (e.g., substantial such that the load affects the fuel efficiency), the battery SOC is consumed, and thus, inefficient engine torque increase and EV driving decrease occur to lower the fuel economy. According to the present disclosure, the high electric load driving situation may be identified as the second priority during the driving pattern identification, and when the large electric load situation is detected, exhaustion of the battery SOC may be prevented to improve the fuel economy.

The identifying of the aggressive driving pattern (S30) may include identifying the aggressive driving situation by detecting a repeated acceleration intention (S31) and the high driving load (S32). Since the aggressive driving situation requires substantial driving energy, the battery SOC is reduced, and the driving is performed in a region where the engine torque is inefficient to cause an abrupt decrease of the fuel economy. According to the present disclosure, the aggressive driving situation may be identified as the third priority during the driving pattern identification.

The identifying of the repeated acceleration intention (S31) may include counting a situation in which an APS is equal to or greater than a predetermined value (e.g., determines the number of times that such a situation occurs) and a high APS state may be identified when the number of times of counting is equal to or greater than a predetermined value γ. According to the present disclosure, the identifying of the high driving load (S32) may additionally be performed to distinguish a temporary high APS state that is not the aggressive driving situation. In other words, if the acceleration intention is not repeated the predetermine number of times (γ), a temporary high APS state may be detected instead.

The identifying of the high driving load (S32) may include determining whether a traction power is equal to or greater than a predetermined value δ by calculating the traction power for recognizing the driving load. When the traction power is equal to or greater than the predetermined value δ, the selecting the aggressive driving pattern (S33) may include selecting the aggressive driving pattern 30 as the current driving pattern.

Further, in the identifying of the high driving load (S32), the traction power may be calculated as the total power to be output by a power source through the driver's APS state, and in particular, the traction power may be calculated as a target power of the engine and motor in the hybrid vehicle. The aggressive driving situation may also be identified by separately monitoring the repeated acceleration intention and the driving load. Further, the traction power for recognizing the driving load may be changed to a traction torque or an engine torque, and the APS may be changed to an acceleration amount obtained by an acceleration sensor.

Last, the identifying of the high speed driving pattern and the city driving pattern (S40) may include determining whether an average vehicle speed is equal to or greater than a predetermined value ε by determining the average vehicle speed. When the average vehicle speed is equal to or greater than the predetermined value ε, the selecting the high speed driving pattern (S42) may include selecting the high speed driving pattern as the current driving pattern. When the average vehicle speed is less than the predetermined value ε, the selecting of the city driving pattern (S43) may include selecting the city driving pattern 50 as the current driving pattern.

In the high speed driving situation, the driving load may be increased, and engine and motor operation regions may thus be changed. According to the present disclosure, the high speed driving situation may be identified as the fourth priority during the driving pattern identification, and the high speed driving and low speed driving may be identified more accurately using the average speed of the vehicle, and thus, the hybrid control may be optimized. The respective stages of the method for identifying the driving pattern of the hybrid vehicle according to the present disclosure may be performed by a hybrid control unit (HCU).

As described above, according to the method for identifying the driving pattern of the hybrid vehicle according to the present disclosure, the driving pattern optimized to the fuel economy may be selected in accordance with the driving situation, and thus the hybrid control may be optimized.

In other words, in the high heating load driving pattern, the engine efficiency may be improved through engine torque optimization in consideration of the heating load state, unnecessary engine start may be prevented, and the EV driving may be increased through the battery SOC optimization (e.g., the distance of EV driving may be increased since the battery SOC may be maintained or reduced at a less rapid speed). Further, in the high electric load driving pattern, the high electric load state may be recognized, and the fuel economy may be improved through engine torque optimization and shift pattern optimization. In the aggressive driving pattern, fuel economy improvement through battery SOC protection becomes possible through the engine torque optimization and the shift pattern optimization caused by the abrupt acceleration and high driving load. In the high speed driving pattern and the city driving pattern, fuel economy improvement becomes possible through the engine torque and shift pattern to match the city and high speed, and optimum control at an engine on/off time.

Additionally, according to the method for identifying the driving pattern of the hybrid vehicle according to the present disclosure, the heating performance may be improved by increasing the engine power through the torque and revolutions per minute (RPM) control during recognition of the high heating load state, and during the aggressive driving, the acceleration performance during restarting may be increased through lock up charge of the engine start during tip out. During the city driving, frequent engine on/off may be prevented by increasing the EV at low speed, and thus merchantability of the hybrid vehicle may be improved.

While the present disclosure has been described with respect to the specific exemplary embodiments, it will be apparent to those skilled in the art that various changes and modifications may be made without departing from the spirit and scope of the disclosure as defined in the following claims.

What is claimed is:

1. A method for identifying a driving pattern with a controller for fuel economy improvement of a hybrid vehicle, wherein the controller includes a processor programmed to perform identification of the driving pattern based on environment conditions of the vehicle and a memory configured to store information generated by the processor, comprising:

allocating, by the controller, priorities in accordance with influences exerted on fuel economy based on the environment conditions including a heating load and an electric load; and selecting, by the controller, a current driving pattern out of a plurality of driving patterns including a high heating load driving pattern, a high electric load driving pattern, an aggressive driving pattern, a high speed driving pattern, and a city driving pattern, wherein a first priority is allocated when the heating load is in a high heating load state, and the high heating load driving pattern is selected as the current driving pattern, and wherein a second priority is allocated when the electric load is in a high electric load state, and the high electric load driving pattern is selected as the current driving pattern.

2. The method according to claim 1, further comprising a third priority to be allocated when a driver's propensity is aggressive, and the aggressive driving pattern is selected as the current driving pattern.

3. The method according to claim 1, further comprising a fourth priority to be allocated when the average vehicle speed is the high speed, and the high speed driving pattern is selected as the current driving pattern.

4. The method according to claim 3, wherein when the average vehicle speed is not the high speed, the city driving pattern is selected as the current driving pattern.

5. A method for identifying a driving pattern with a controller for fuel economy improvement of a hybrid vehicle, wherein the controller includes a processor programmed to perform identification of the driving pattern based on environment conditions of the vehicle and a memory configured to store information generated by the processor, comprising:

selecting, by the controller, a current driving pattern by sequentially identifying a driving pattern out of a plurality of driving patterns including a high heating load driving pattern, a high electric load driving pattern, an aggressive driving pattern, and a high speed driving pattern and a city driving pattern based on allocated priorities determined by influences exerted on fuel economy based on a heating load and an electric load, wherein the identifying of the high heating load driving pattern includes identifying a high heating load driving situation as a first priority by sequentially identifying a driver's heating intention and a heating level, and wherein the identifying of the high electric load driving pattern includes identifying a high electric load driving situation as a second priority by determining whether an electric load amount is equal to or greater than a predetermined value by detecting the electric load amount.

6. The method according to claim 5, wherein the identifying of the driver's heating intention includes determining whether a blower switch is in an on state by monitoring a blower switch condition of a full automatic temperature control (FATC).

7. The method according to claim 6, wherein the identifying of the heating level includes determining whether a difference between an outdoor air temperature and a set temperature of the FATC is equal to or greater than a predetermined value.

8. The method according to claim 7, wherein when the difference between the outdoor air temperature and the set temperature of the FATC is equal to or greater than the predetermined value, the high heating load driving pattern is selected as the current driving pattern.

9. The method according to claim 5, wherein when the electric load amount is equal to or greater than the predetermined value, the high electric load driving pattern is selected as the current driving pattern.

10. The method according to claim 5, wherein the identifying of the aggressive driving pattern includes identifying an aggressive driving situation by detecting a repeated acceleration intention and a high driving load.

11. The method according to claim 10, wherein the detecting of the repeated acceleration intention includes counting a number of times that an APS is equal to or greater than a predetermined value and identifying a high APS state when the number of times of counting is equal to or greater than a predetermined value.

12. The method according to claim 11, wherein the identifying of the high driving load includes determining whether a traction power is equal to or greater than a predetermined value by calculating the traction power for recognizing the driving load.

13. The method according to claim 12, wherein when the traction power is equal to or greater than the predetermined value, the aggressive driving pattern is selected as the current driving pattern.

14. The method according to claim 5, wherein the identifying of the high speed driving pattern and the city driving pattern includes identifying a high speed driving situation by determining whether an average vehicle speed is equal to or greater than a predetermined value by detecting the average vehicle speed.

15. The method according to claim 14, wherein when the average vehicle speed is equal to or greater than the predetermined value, the high speed driving pattern is selected as the current driving pattern.

16. The method according to claim 14, wherein when the average vehicle speed is less than the predetermined value, the city driving pattern is selected as the current driving pattern.

* * * * *